Nov. 25, 1969    T. E. LENIGAN    3,480,955
RADAR TRACKING ERROR INDICATOR
Filed June 29, 1960
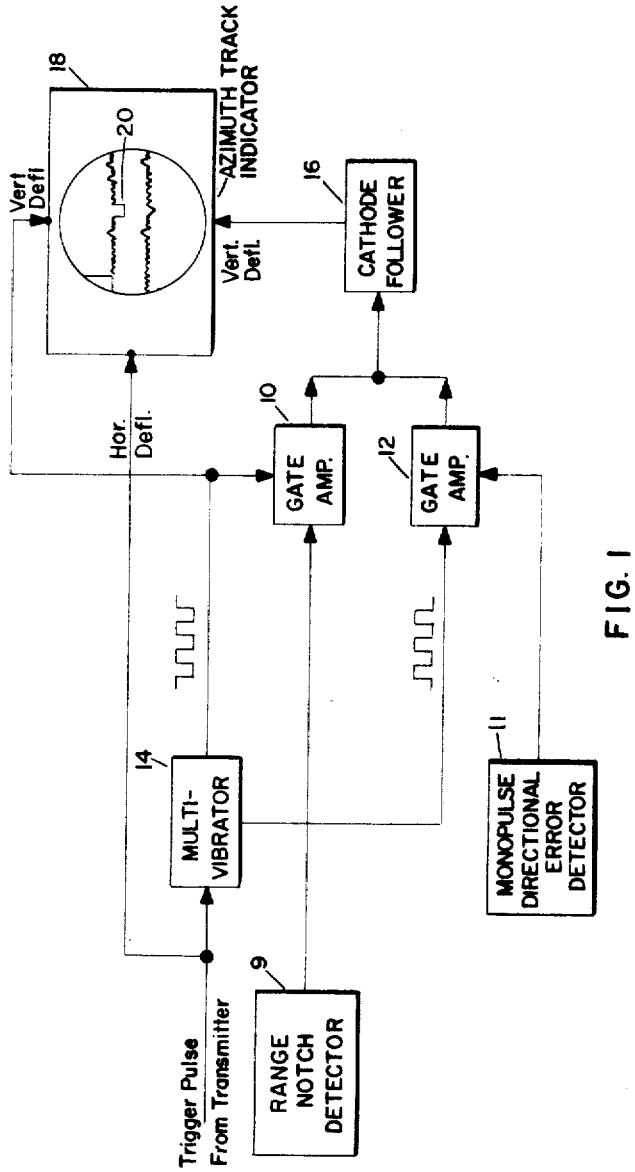
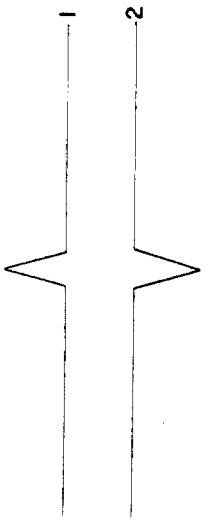
FIG. 1
FIG. 2
THOMAS E. Lenigan,
*INVENTOR.*
BY S. J. Rotondi
A. J. Dupont
C. A. Phillips
ATTORNEYS

United States Patent Office 3,480,955
Patented Nov. 25, 1969

3,480,955
RADAR TRACKING ERROR INDICATOR
Thomas E. Lenigan, Morris Township, N.J., assignor, by mesne assignments, to the United States of America as represented by the Secretary of the Army
Filed June 29, 1960, Ser. No. 39,745
Int. Cl. G01s 9/06
U.S. Cl. 343—11                3 Claims This invention relates to improvements in radar tracking systems, and more particularly to improvements in presentation modes for use with manual tracking.

In normally automatic tracking radar systems the need occasionally arises for manual tracking (controlling antenna orientation manually). Such instances are encountered in acquiring targets and in tracking targets through stationary objects, as is often the case when radar countermeasures are employed to screen a target. Under these conditions, spurious signals will cause an automatic tracking radar to provid erratic and erroneous information regarding target position, since automatic tracking circuits tend to favor the strongest signal.

In view of the above, it is essential to provide means to visually detect any antenna tracking error existing with respect to a desired target. One such system, used with lobing type radars, employs a cathode ray tube having a horizontal sweep, upon which tube target information is presented as two vertical pips. The relative height of these two pips represents the error in target tracking, the height of these pips being directly detemined by the signal magnitude from the different lobes of the radar. In theory, the radar is positioned by the operator so as to keep the two pips of equal height, at which time the radar is receiving equal amplitude returns from both lobes, and hence is directed exactly at the target. In practice, however, it is extremely difficult for the operator to match the heights of the two pips exactly, the human eye not being well suited to make such exact comparisons in relative heights. The task is further complicated by the fact that random noise impulses will often add to, or substract from, the height of the pips, making even more difficult the job of matching their heights.

Therefore, it is the object of this invention to provide a means whereby a more accurate visual determination of errors in radar tracking can be accomplished.

This invention may be better understood through consideration of the following description and drawings in which:

FIGURE 1 is a block diagram of an embodiment of this invention;

FIGURE 2 is a representation of error information presentation as is provided by the invention.

Referring to FIGURE 1, a range notch signal from detector 9 is fed to gated amplifier 10. Simultaneously, a directional error signal, either elevation or azimuth, is obtained. In a monopulse radar, this error signal may be obtained conveniently as the difference in signal returns from oppositely tilted antennas. The polarity of the error signal indicates the error sense, left-right or high-low, and the magnitude of the signal indicates the magnitude of the error. This signal is applied to gated amplifier 12. Gated amplifiers 10 and 12 are gated "on" and "off" by opposite polarity outputs of multivibrator 14, amplifier 10 being "on" while amplifier 12 is off and vice versa. Multivibrator 14 is rate regulated by a trigger pulse from the radar transmitter although such synchronization is not essential. Gated amplifiers 10 and 12 function as an electronic switch to provide an input to cathode follower amplifier 16, which input is alternately an error signal and a range signal. The output of cathode follower 16 is fed to the vertical circuit of oscilloscope 18. The horizontal sweep of oscilloscope 18 is triggered by a trigger pulse from the associated radar transmitter.

An output from multivibrator 14 is also connected to the vertical deflection circuit of oscilloscope 18. The effect of the circuit interconnections is to produce on the indicator portion of oscilloscope 18 the upper and lower traces shown, where the upper trace displays the range notch output of amplifier 10 and the lower trace displays the directional error output of amplifier 12. Inasmuch as bo'h traces are with respect to the same horizontal time base, identical targets appear on both traces in the same time or range position; in other words, they lie along the same vertical line. An operator may thus readily pick the error pip corresponding to the target in range notch 20, representing the target being tracked in range. As illustrated in FIGURE 2, the upward pip on trace 1 represents an error of one sense and the downward pip on trace 2 represents an error of the opposite sense. Trace 3, showing no pip, represents a no-error or on-target condition. For purposes of illustration, only a single target is depicted in FIGURE 2.

It will be appreciated that the principles of the invention explained in connection with a specific exemplification thereof will suggest many other applications and modifications of the same. It is accordingly desired that, in construing the breadth of the appended claims, they shall not be limited to the specific details shown and described in connection with exemplifications thereof.

While the foregoing is a description of the preferred embodiment, the following claims are intended to include those modifications and variations that are within the spirit and scope of my invention.

I claim:

1. In a radar system, a tracking error indicator comprising: an oscilloscope having a first direction deflection circuit synchronized with a radar transmitter, a second direction deflection circuit acting perpendicularly to said first circuit, means for providing a combined range notch signal, means for providing a tracking error signal, gating means, and means for generating a gating signal which changes between a first and second value, said gating signal being coupled to said second deflection circuit of said oscilloscope and to said gating means, said range notch signal and said error signal being coupled to said gating means, said gating means including means responsive to said gating signal to alternately couple said range notch signal and said error signal to said second deflection circuit, said gating signal acting on said second deflection circuit to provide first and second trace presentations, said first presentation corresponding to said range notch and said second presentation corresponding to said error signal.

2. The tracking error indicator set forth in claim 1 wherein said means responsive to said gating means comprises first and second gated amplifiers, said range notch signal being coupled through said first gated amplifier and said error signal being coupled through said second gated amplifier.

3. The tracking error indicator set forth in claim 2 wherein said means for generating comprises a multivibrator.

References Cited

UNITED STATES PATENTS 2,416,088  2/1947  Deernake _____ 343—11

RODNEY D. BENNETT, Jr., Primary Examiner

M. F. HUBLER, Assistant Examiner